United States Patent
Shaikh et al.

(10) Patent No.: US 10,531,344 B2
(45) Date of Patent: Jan. 7, 2020

(54) RADIO ACCESS TECHNOLOGY CHANGE REPORTING

(71) Applicant: Verizon Patent and Licensing Inc., Arlington, VA (US)

(72) Inventors: Imtiyaz Shaikh, Irving, TX (US); Ho Yin Cheuk, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 15/988,268

(22) Filed: May 24, 2018

(65) Prior Publication Data

US 2019/0364464 A1   Nov. 28, 2019

(51) Int. Cl.
*H04W 36/00* (2009.01)
*H04M 15/00* (2006.01)
*H04L 12/14* (2006.01)
*H04W 4/24* (2018.01)

(52) U.S. Cl.
CPC ..... *H04W 36/0022* (2013.01); *H04L 12/1407* (2013.01); *H04M 15/66* (2013.01); *H04W 4/24* (2013.01)

(58) Field of Classification Search
CPC H04W 36/0022; H04W 4/24; H04L 12/1407; H04M 15/66
See application file for complete search history.

(56) References Cited

U.S. PATENT DOCUMENTS

| 8,521,858 | B2* | 8/2013 | Shaikh | H04L 29/12216 709/223 |
| 8,885,613 | B2* | 11/2014 | Sachs | H04W 48/18 370/334 |
| 8,958,799 | B2* | 2/2015 | Vangala | H04W 36/26 370/252 |
| 9,370,037 | B2* | 6/2016 | Avula | H04W 56/002 |
| 2011/0317560 | A1* | 12/2011 | Aramoto | H04W 36/28 370/235 |
| 2014/0099941 | A1* | 4/2014 | Ji | H04W 16/14 455/423 |
| 2015/0148038 | A1* | 5/2015 | Griot | H04W 8/18 455/435.3 |
| 2015/0289167 | A1* | 10/2015 | Alex | H04W 28/24 370/329 |
| 2017/0318502 | A1* | 11/2017 | Singh | H04W 76/10 |
| 2018/0041897 | A1* | 2/2018 | Prasad | H04W 4/50 |

FOREIGN PATENT DOCUMENTS

| WO | WO-2013144950 A1 * | 10/2013 | ............ H04W 28/08 |
| WO | WO-2017062057 A1 * | 4/2017 | ............ H04W 76/15 |

* cited by examiner

*Primary Examiner* — Julio R Perez

(57) ABSTRACT

A computing device may include a memory configured to store instructions and a processor configured to execute the instructions to monitor a radio access technology type being used by a user equipment (UE) device to wirelessly communicate with a base station. The processor may be further configured to detect a change from a first radio access technology type to a second radio access technology type; determine that the second radio access technology type has been sustained for at least a particular time period; and report information identifying the change from the first radio access technology type to the second radio access technology type to a Policy and Charging Rules Function (PCRF) device.

20 Claims, 7 Drawing Sheets

RADIO ACCESS TECHNOLOGY CHANGE REPORTING

BACKGROUND INFORMATION

Wireless communication services continue to improve and expand available services as well as networks used to deliver such services. One aspect of such improvements includes the development of wireless access networks as well as options to utilize such wireless access networks. Network providers may manage a large number of wireless access networks and a particular wireless access network may manage a large number of devices. In order to maintain a quality of service across a network, or across multiple networks, network providers may need to manage different radio technology types.

DETAILED DESCRIPTION OF PREFERRED EMBODIMENTS

Figure 1:
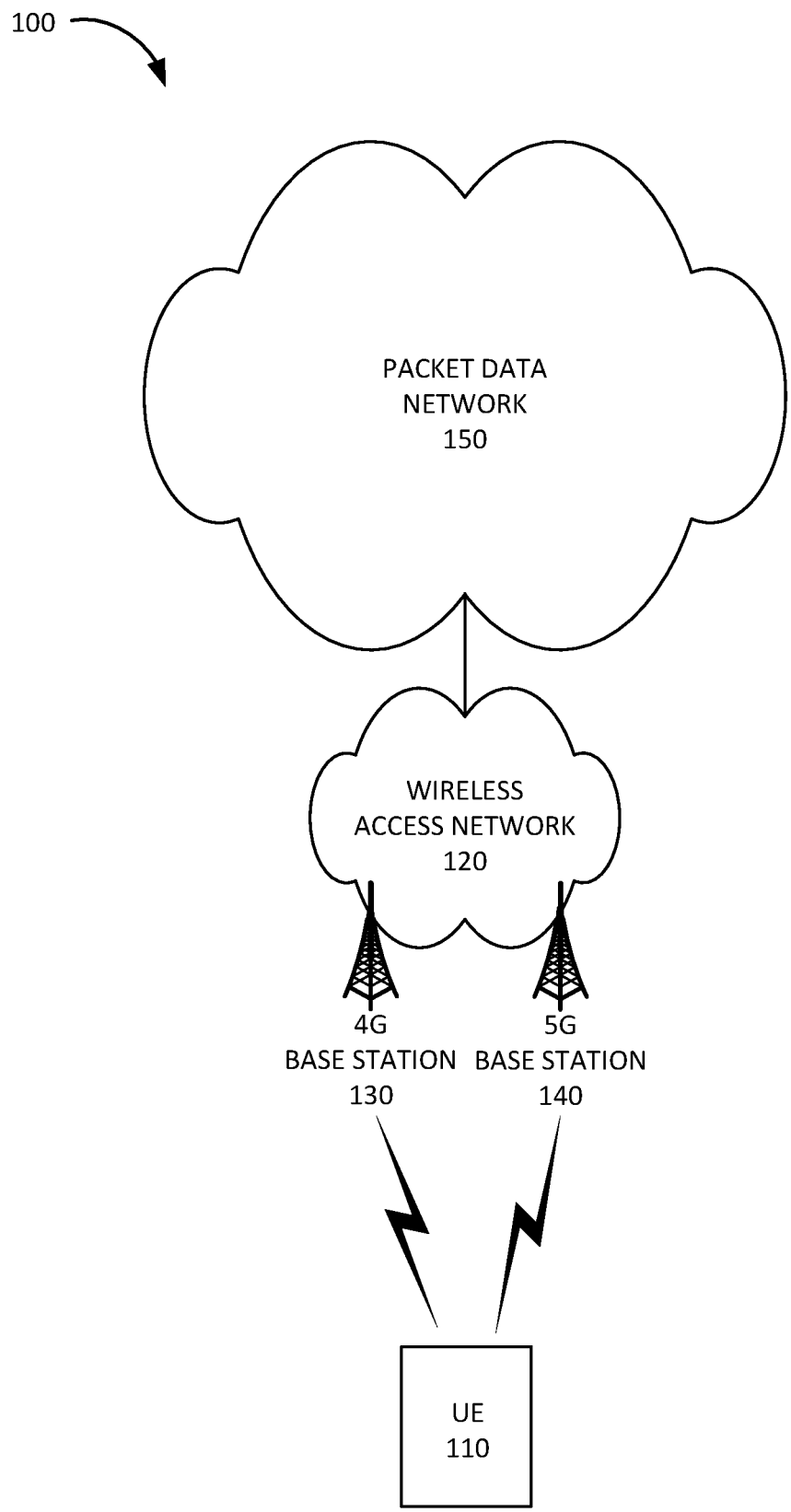
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks may become increasingly more complicated. One way in which wireless access networks are continuing to become more complicated is by incorporating various aspects of next generation networks like Fifth Generation (5G) mobile networks, such as high frequency bands and a large number of antennas. 5G mm-wave air interface technology, referred to as 5G New Radio (NR) radio access technology (RAT), may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The 5G NR RAT mm-wave air interface may include a high bandwidth that provides high data throughput in comparison to the data throughput of a Fourth Generation (4G) Long Term Evolution (LTE) air interface. However, because of the high mm-wave frequencies, the 5G NR RAT air interface may be susceptible to intermittent signal quality degradation due to multipath wave propagation and fading as a result of scattering from terrain objects, such as buildings, foliage, mountains, vehicles, etc.; reflection from bodies of water; ionospheric reflection and/or refraction; atmospheric attenuation and scattering; and/or other types of signal interference. Such variations in signal quality may be particularly important in areas with a low density of 5G coverage, such as during initial deployment of 5G base stations.

5G NR coverage may initially be deployed as islands relative to existing air interface coverage. Thus, areas with 5G NR RAT coverage may also provide existing 4G RAT coverage and UE devices enabled to communicate using 5G NR may be able to attach to both a 4G base station and a 5G base station. A UE device may be simultaneously attached to a master cell group (MCG), also known as a master eNodeB, and a secondary cell group (SCG), also known as a secondary eNodeB. If 5G NR RAT coverage is available, the SCG may correspond to a 5G NR RAT base station, referred to as a gNodeB. Dual coverage using 4G and 5G networks may be referred as interoperability Option 3x.

Option 3x may include a split bearer option in which a gNodeB splits user plane traffic when the 5G NR RAT air interface is not available (e.g., signal quality of the 5G NR air interface is below a signal quality threshold, the capacity of the 5G NR RAT air interface is below a capacity threshold, etc.). Thus, when the 5G NR RAT link is available, downlink data may be sent to the UE device via the gNodeB. When the 5G NR RAT link is not available, downlink data may be sent by the 5G base station to the eNodeB and the eNodeB may send the downlink data to the UE device via the 4G RAT air interface. Therefore, gNodeB may switch back and forth between sending the data via the 5G RAT air interface and the 4G RAT air interface.

An access network keeps track of user data to determine whether a UE device has exceeded an allocated data rate and/or data amount, to charge for excess data consumption, reduce user bandwidth if a UE device has exceeded an allocated data rate/amount and/or is determined to be a service data abuser, and/or otherwise apply policy and charging rules. In a 4G network, policy and charging rules may be maintained and applied by a Policy and Charging Rules Function (PCRF) device. As different policies may be applied for 4G and 5G RAT types, the PCRF device may need to obtain information identifying which RAT type is being used by a particular UE device. For example, the PCRF device may need to restrict a data throughput when a UE device switches from receiving downlink data via a 5G NR RAT type to a 4G LTE RAT type, as the 4G LTE air interface may not be able to sustain the high throughput rates for which the 5G NR air interface is configured.

Implementations described herein relate to RAT type change reporting. A RAT type may refer to the underlying type of wireless Radio Access Network (RAN) technology used by a UE device to connect to and communicate with a base station. A base station, such as a gNodeB, may include a split bearer flow control function that is aware during both uplink and downlink data flow whether user plane packets are traversing using a 5G RAT air interface or a 4G RAT air interface. The split bearer flow control function, also referred to as a NR packet data convergence protocol (PDCP) function, may be configured to provide information identifying the RAT type, and/or a change from a first RAT type to a second RAT type, to a PCRF device.

The base station may monitor a RAT type being used by a UE device to wirelessly communicate with the base station; detect a change from a first RAT type to a second RAT type for the UE device; determine that the second RAT type has been sustained for at least a particular time period; and report information identifying the change from the first RAT type to the second RAT type to a PCRF device. The particular time period may be based on a configurable timer.

The first RAT type may include a 5G NR air interface and the second RAT type may include a 4G LTE air interface. Alternatively, the first RAT type may include a 4G LTE air interface and the second RAT type may include a 5G NR air interface. In some implementations, reporting information identifying the RAT type change may include sending the information identifying the RAT type change to the PCRF device via an eNodeB over an X2 interface. The eNodeB may forward the information to a Mobility Management Entity (MME) via an S1-C interface, the MME may forward the information to a Serving Gateway (SGW) via an S11 interface, the SGW may forward the information to a Packet Data Network Gateway (PGW) via an S5-C interface, and the PGW may forward the information to the PCRF device via a Gx interface. In other implementations, reporting information identifying the RAT type change may include sending the information identifying the RAT type change to the PCRF device via a device configured to interface the base station with the PCRF device. In yet other implementations, reporting information identifying the RAT type change may include sending the information identifying the RAT type change to the PCRF device over an interface configured to interface the base station with the PCRF device.

The information identifying the RAT change may include information identifying the first RAT type and the second RAT type; information identifying a time associated with the RAT type change; information identifying a data stream type associated with the UE device; information identifying a data throughput associated with the UE device; information identifying a data use history associated with the UE device; and/or other types of information.

The base station may change the RAT type based on one or more criteria, such as signal quality, bandwidth capacity, number of UE devices associated with the base station, service classes associated with data stream associated with the base station, and/or other types of criteria. For example, the base station may determine that a signal quality of a 5G NR air interface is below a signal quality threshold and select to switch to a 4G LTE air interface to communicate with a UE device, in response to determining that the signal quality of the 5G NR air interface is below the signal quality threshold.

The base station may be further configured to receive instructions from the PCRF device to implement a policy based on the RAT change. For example, the base station may receive, from the PCRF device, an instruction to reduce a data throughput associated with the UE device and reduce the data throughput associated with the UE device, in response to receiving the instructions to reduce the data throughput. The data throughput may be reduced on a data throughput capacity associated with the second RAT type (e.g., 4G LTE air interface).

Reporting a RAT type change to a PCRF device may improve network efficiency by enabling the PCRF device to apply policies to data streams based on RAT types associated with the data streams, resulting in more efficient bandwidth use and/or more efficient use of processor and memory by network devices, such as base stations.

FIG. 1 is a diagram of an exemplary environment 100 in which the systems and/or methods, described herein, may be implemented. As shown in FIG. 1, environment 100 may include a UE device 110, a wireless access network 120, and a packet data network 150.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice and/or video communication, ultra-reliable low latency communication (URLLC), mobile broadband services (e.g., video streaming, real-time gaming, premium Internet access etc.), best effort data traffic, and/or other types of applications.

In other implementations, UE device 110 may include a wireless Internet of Things (IoT) device configured to communicate wirelessly with wireless access network 120 using a machine-to-machine (M2M) interface, such as a Machine Type Communication (MTC) and/or a different type of M2M interface. For example, UE device 110 may be coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In yet other implementations, UE device 110 may correspond to an unmanned ground or aerial vehicle or an unmanned aircraft system that communicates wirelessly with other devices over an M2M interface using MTC and/or another type of M2M communication. Examples of such airborne MTC devices include self-driving vehicles; consumer drone devices used for entertainment, photo or video capture, payload delivery, and/or other uses; commercial delivery drones used to deliver packages to customers; law enforcement drones used for intelligence gathering operations; and/or other types of vehicles, drones, aerostats, or other aerial devices.

Wireless access network 120 may provide access to packet data network 150 for wireless devices, such as UE device 110. Wireless access network 120 may enable UE device 110 to connect to packet data network 150 for mobile telephone service, Short Message Service (SMS) message service, Multimedia Message Service (MMS) message service, Internet access, cloud computing, and/or other types of data services.

Wireless access network 120 may establish or may be incorporated into a packet data network connection between UE device 110 and packet data network 150 via one or more Access Point Names (APNs). For example, wireless access network 120 may establish an Internet Protocol (IP) connection between UE device 110 and packet data network 150. Furthermore, wireless access network 120 may enable UE device 110 to communicate with an application server, and/or another type of device, located in packet data network 150 using a non-IP communication method, such as, for example, Data over Non-Access Stratum (DoNAS).

In some implementations, wireless access network 120 may include a Long Term Evolution (LTE) access network (e.g., an evolved packet core (EPC) network). In other implementations, wireless access network 120 may include a Code Division Multiple Access (CDMA) access network. For example, the CDMA access network may include a CDMA enhanced High Rate Packet Data (eHRPD) network (which may provide access to an LTE access network).

Furthermore, wireless access network 120 may include an LTE Advanced (LTE-A) access network and/or a Fifth Generation (5G) access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, wireless access network 120 may include a 4G base station 130 (e.g., an eNodeB) and a 5G base station 140 (e.g., a gNodeB). 4G base station 130 and 5G base station 140 may each include one or more cells that include devices and/or components configured to enable wireless communication with UE devices 110. For example, each cell may include a radio frequency (RF) transceiver facing a particular direction. 4G base station 130 may be configured to communicate with UE devices 110 using a 4G LTE air interface. 5G base station 140 may be configured to communicate with UE devices 110 using a 5G NR air interface. For example, 5G base station 140 may include one or more antenna arrays configured to send and receive wireless signals in the mm-wave frequency range.

Packet data network 150 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of packet data network 150 may be managed by a provider of communication services that also manages wireless access network 120. Packet data network 150 may allow the delivery of Internet Protocol (IP) services to UE device 110, and may interface with other external networks. Packet data network 150 may include one or more server devices and/or network devices, or other types of computation or communication devices. In some implementations, Packet data network 150 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
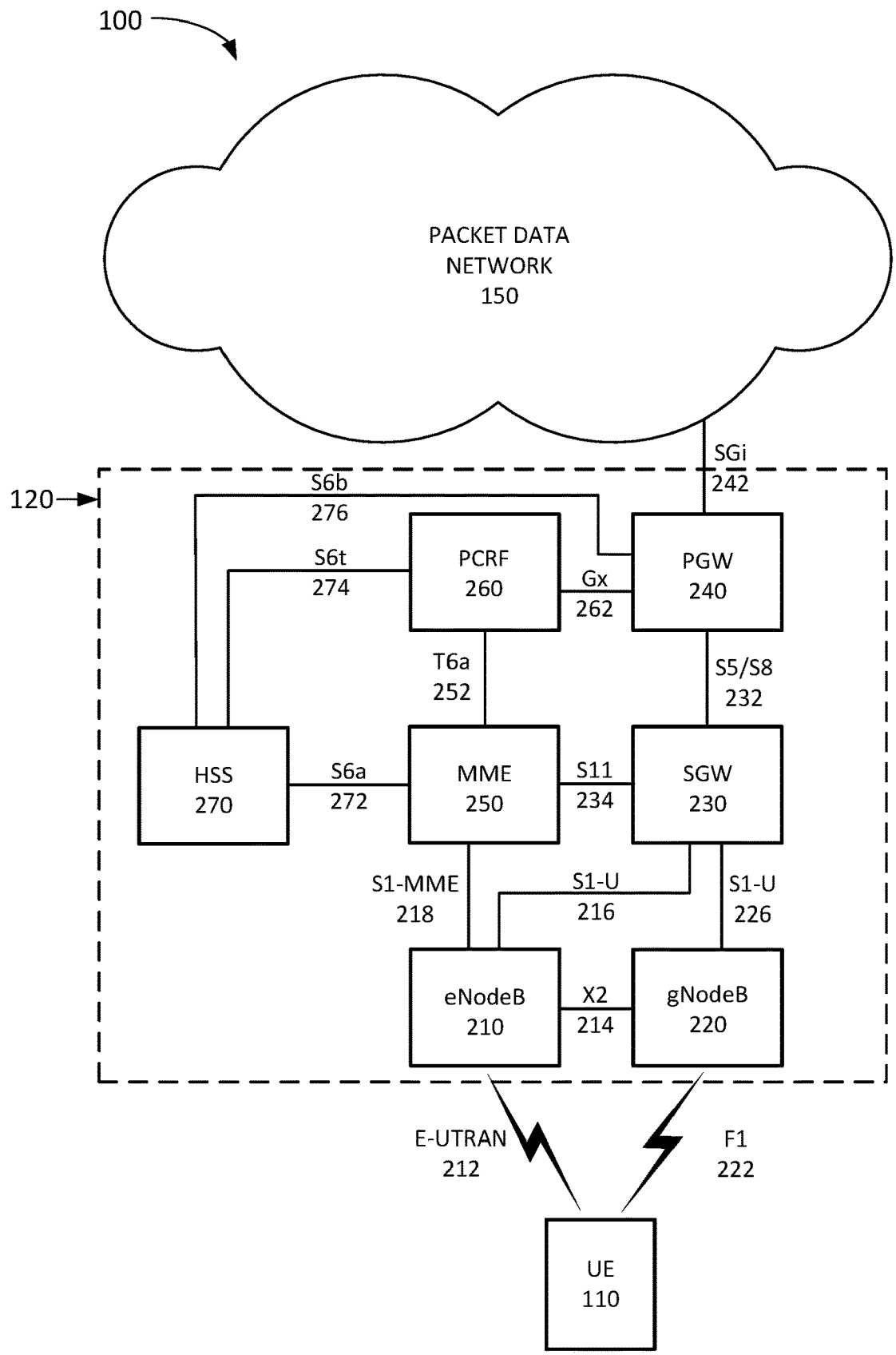
FIG. 2 is a diagram illustrating exemplary components of the access network of FIG. 1.

FIG. 2 is a diagram illustrating exemplary components of wireless access network 120 in the context of environment 100 according to an implementation described herein. As shown in FIG. 2, wireless access network 120 may include eNodeB 210, gNodeB 220, a Serving Gateway (SGW) 230, a Packet Data Network (PDN) Gateway (PGW) 240, a Mobility Management Entity (MME) 250, a PCRF device 260, and Home Subscriber Server (HSS) 270. While FIG. 2 depicts a single eNodeB 210, a single gNodeB 220, a single SGW 230, a single PGW 240, a single MME 250, a single PCRF device 260, and a single HSS 270, for illustration purposes, in practice, FIG. 2 may include multiple eNodeBs 210, multiple gNodeB 220, multiple SGW 230, multiple PGW 240, multiple MME 250, multiple PCRF device 260, and/or multiple HSS 270.

eNodeB 210 may correspond to 4G base station 130. eNodeB 210 may communicate with UE device 110 using a 4G LTE air interface referred to as an Evolved Universal Mobile Telecommunications System (UMTS) Terrestrial Radio Access Network (E-UTRA) interface 212. eNodeB 210 may interface with wireless access network 120 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using GTPv2.

gNodeB 220 may correspond to 5G base station 140. gNodeB 220 with UE device 110 using a 5G NR air interface referred to as an F1 interface 222. gNodeB 220 may communicate with SGW 230 using an S1-U interface 226. gNodeB 220 may communicate with eNodeB 210 using an X2 interface 214. For example, when gNodeB 220 determines that F1 interface 222 is not available, gNodeB 220 may forward downlink data to UE device 110 via eNodeB 210 using X2 interface 214. Furthermore, gNodeB 220 may report information relating to a RAT type change associated with UE device 110 to PCRF device 260 via eNodeB 210 using X2 interface 214.

SGW 230 may provide an access point to and from UE device 110, may handle forwarding of data packets for UE device 110, and may act as a local anchor point during handover procedures between eNodeBs 210 and/or gNodeB 220. SGW 230 may interface with PGW 240 through an S5/S8 interface 232. S5/S8 interface 232 may be implemented, for example, using GTPv2. PGW 240 may function as a gateway to packet data network 150 through an SGi interface 242. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 250 may implement control plane processing for wireless access network 120. For example, MME 250 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 250 may also select a particular SGW 230 for a particular UE device 110. A particular MME 250 may interface with other MMES 250 in wireless access network 130 (not shown in FIG. 2) and may send and receive information associated with UE devices 110, which may allow one MME 250 to take over control plane processing of UE devices serviced by another MME 250, if the other MME 250 becomes unavailable. Furthermore, MME 250 may manage non-IP communication with UE 110 using NAS.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to wireless access network 130, when bearers need to be added or modified for an existing session for the particular UE device 110, when a connection to a new PGW 240 needs to be created, or during a handover procedure (e.g., when the particular UE device 110 needs to switch to a different SGW 230).

PCRF device 260 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF device 260 may communicate with PGW 240 through a Gx interface 262. Gx interface 262 may be implemented, for example, using Diameter protocol. PCRF device 260 may receive information relating to a RAT type change associated with UE device 110 from PGW 240 via Gx interface 262. PGW 240 may receive the information from SGW 230 via S5/S8 interface 232, SGW 230 may receive the information via S1-U interface 216 from eNodeB 210, and eNodeB 2120 may receive the information from gNodeB 220 via X2 interface 214. In other implementations, a function node may be included in wireless access network 120 to enable gNodeB 220 to directly communicate with PCRF device 260 (not shown in FIG. 2). In yet other implementations, wireless access network 120 may include an interface that enables PCRF device 260 and gNodeB 220 to communicate directly (not shown in FIG. 2).

HSS 270 may store subscription information associated with UE devices 110 and/or information associated with users of UE devices 110. For example, HSS 270 may store subscription profiles that include authentication and access authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 270 may communicate with MME 250 through an S6a interface 272. S6a interface 272 may be implemented, for example, using a Diameter protocol. HSS 270 may communicate with PCRF device 260 using an S6t interface 274 and with PGW 240 using an S6b interface 276.

Although FIG. 2 shows exemplary components of wireless access network 130, in other implementations, wireless access network 130 may include fewer components, different components, differently arranged components, or additional components than depicted in FIG. 2. Additionally or alternatively, one or more components of wireless access network 130 may perform functions described as being performed by one or more other components of wireless access network 130.

Figure 3:
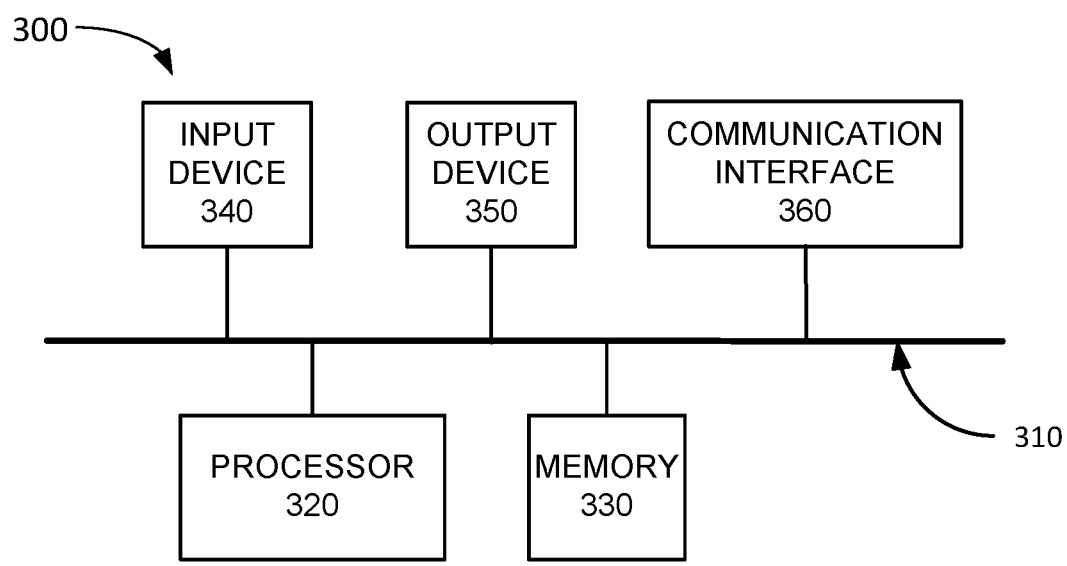
FIG. 3 is a diagram illustrating exemplary components of a device that may be included in a device of FIG. 1 and/or FIG. 2.

FIG. 3 is a diagram illustrating example components of a device 300 according to an implementation described herein. UE device 110, eNodeB 210, gNodeB 220, SGW 230, PGW 240, MME 250, PCRF device 260, and/or HSS 270 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the management of a RAT type change for UE device 110. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
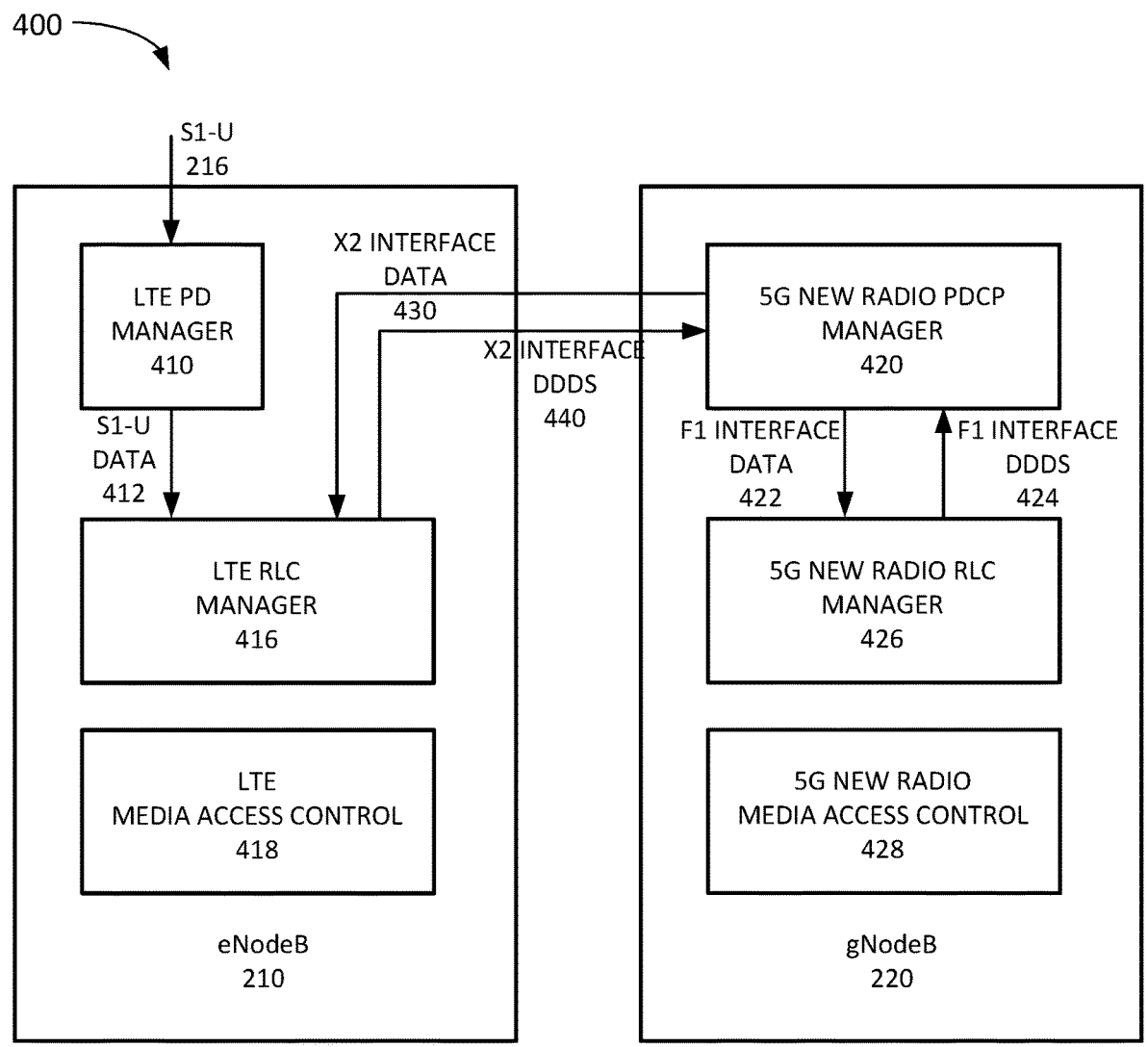
FIG. 4 is a diagram illustrating exemplary functional components of the eNodeB and gNodeB of FIG. 2.

FIG. 4 is a diagram illustrating exemplary functional components of eNodeB 210 and gNodeB 220. The functional components of eNodeB 210 and gNodeB 220 may be implemented, for example, via processor 320 executing instructions from memory 330. Alternatively, some or all of the functional components included in eNodeB 210 and/or gNodeB 220 may be implemented via hard-wired circuitry. As shown in FIG. 4, eNodeB 210 may include an LTE packet data (PD) manager 410, an LTE Radio Link Control (LRC) manager 416, and an LTE media access control (MAC) 418 layer, and gNodeB 220 may include a 5G NR PDCP manager 420, a 5G NR RLC manager 426, and a 5G NR MAC 428 layer.

LTE PD manager 410 may manage data traffic for data packets to and from UE device 110 via eNodeB 210. LTE RLC manager 416 may manage Layer 2 processes associated with the 4G LTE air interface, such as sending acknowledgement messages, error correction through hybrid automatic repeat requests (HARQs), error detection and recovery, packet re-ordering and re-assembly, and/or other RLC processes. LTE MAC 418 may manage MAC processes associated with eNodeB 210.

5G NR PDCP manager 420 may manage data traffic for data packets to and from UE device 110 via gNodeB 220. 5G NR PDPC manager 420 may determine whether to send packets via a 5G NR air interface or a 4G LTE air interface. If 5G NR PDCP manager 420 decides to use a 5G NR air interface, 5G NR PDCP manager 420 may send F1 interface data 422 to 5G NR RLC manager 426 and may receive F1 interface downlink data delivery status (DDDS) information 424 from 5G NR RLC manager 426. If 5G NR PDCP manager 420 decides to use a 4G LTE air interface, 5G NR PDCP manager 420 may send X2 interface data 430 to 4G LTE RLC manager 416 and may receive X2 interface DDDS information 440 from LTE RLC manager 416. 5G NR PDCP manager 420 is described in more detail below with reference to FIG. 5.

5G NR RLC manager 426 may manage Layer 2 processes associated with the 4G LTE air interface, such as sending acknowledgement messages, error correction through HARQs, error detection and recovery, packet re-ordering and re-assembly, and/or other RLC processes. 5G NR MAC 428 may manage MAC processes associated with eNodeB 210.

Although FIG. 4 shows exemplary components of eNodeB 210 and gNodeB 220, in other implementations, eNodeB 210 and/or gNodeB 220 may include fewer components, different components, additional components, or differently arranged components than depicted in FIG. 4. Additionally or alternatively, one or more components of eNodeB 210 and/or gNodeB 220 may perform one or more tasks described as being performed by one or more other components of eNodeB 210 and/or gNodeB 220.

Figure 5:
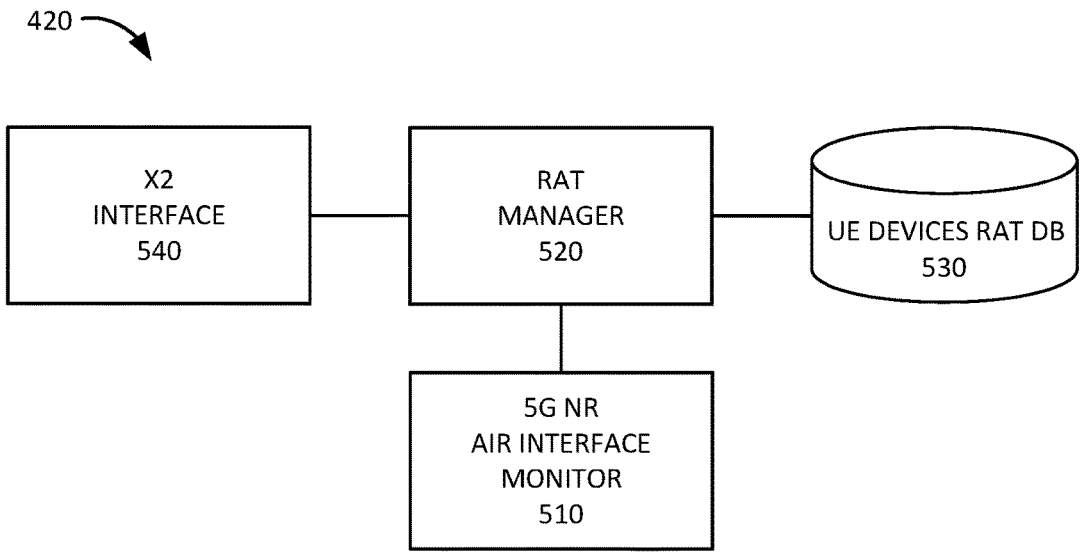
FIG. 5 is a diagram illustrating exemplary functional components of a Next Generation New Radio Packet Data Convergence Protocol manager of FIG. 4.

FIG. 5 is a diagram illustrating exemplary functional components of the 5G NR PDCP manager 420 of FIG. 4. The functional components of 5G NR PDCP manager 420 may be implemented, for example, via processor 320 executing instructions from memory 330. Alternatively, some or all of the functional components included in 5G NR PDCP manager 420 may be implemented via hard-wired circuitry. As shown in FIG. 5, 5G NR PDCP manager 420 may include a 5G NR air interface monitor 510, a RAT manager 520, a UE device RAT DB 530, and an X2 interface 540.

5G NR air interface monitor 510 may monitor the availability and/or status of the 5G NR air interface associated with gNodeB 220. For example, 5G NR air interface monitor 510 may determine one or more measures of quality, capacity, and/or availability for the 5G NR air interface. RAT manager 520 may use the information obtained by 5G NR air interface monitor 510 to determine whether to switch to a different RAT type for UE device 110. For example, if the signal quality associated with the 5G NR air interface drops below a signal quality threshold, RAT manager 520 may switch from a 5G NR air interface to a 4G LTE air interface. If the signal quality improves to higher than the signal quality threshold, RAT manager 520 may switch back from the 4G LTE air interface to the 5G NR air interface.

Furthermore, RAT manager 520 report information relating to a RAT change to PCRF device 260. RAT manager 520 may include a configurable timer that determines how long after a RAT change RAT manager 520 is to wait before reporting the RAT change. The timer may prevent sending reports in situation in which one or more air interfaces are experiencing unstable conditions, resulting in RAT manager 520 switching back and forth between different RAT types. Thus, RAT manager 520 may not report a RAT type change until a particular length of time, corresponding to the length of time set for the timer, has elapsed since the RAT type change.

In some implementations, RAT manager 520 may send the report to PCRF device 260 via eNodeB 210 using X2 interface 214. In other implementations, RAT manager 520 may send the report to PCRF device 260 via a network function device configured to interface gNodeB 220 with PCRF device 260. In yet other implementations, RAT manager 520 may send the report to PCRF device 260 directly using an interface configured to enable communication between gNodeB 220 and PCRF device 260.

UE device RAT DB 530 may store information relating to RAT types associated with particular UE devices 110. Exemplary information that may be stored in UE device RAT DB 530 is described below with reference to FIG. 6. X2 interface 540 may implement X2 interface 214.

Although FIG. 5 shows exemplary components of 5G NR PDCP manager 420, in other implementations, 5G NR PDCP manager 420 may include fewer components, different components, additional components, or differently arranged components than depicted in FIG. 5. Additionally or alternatively, one or more components of 5G NR PDCP manager 420 may perform one or more tasks described as being performed by one or more other components of 5G NR PDCP manager 420.

Figure 6:
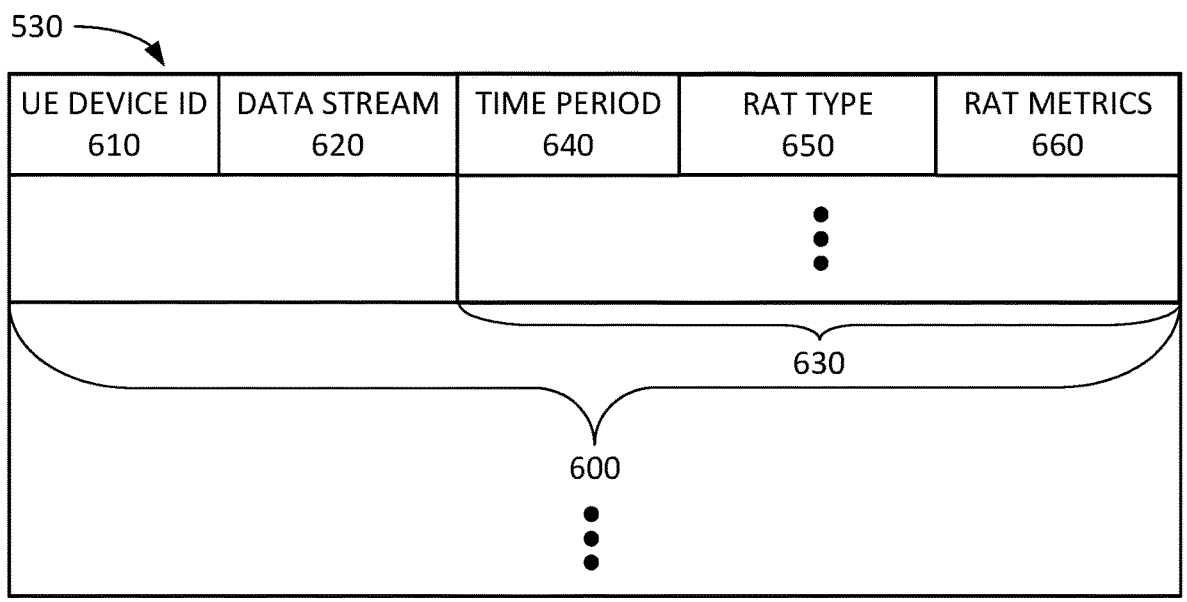
FIG. 6 is a diagram illustrating exemplary components of the user device equipment radio access technology database of FIG. 5.

FIG. 6 is a diagram illustrating exemplary components of UE devices RAT DB 530 of FIG. 5. As shown in FIG. 6, UE devices RAT DB 530 may include one or more UE device records 600. Each UE device record 600 may store information relating to a particular UE device 110. Each UE device record 600 may include a UE device ID field 610, a data stream field 620, and one or more RAT type records 630.

UE device ID field 610 may store one or more identifiers associated with a particular UE device 110 attached to gNodeB 220. For example, UE device ID field 610 may include a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of ID associated with the particular UE device 110.

Data stream field 620 may store information identifying one or more data streams associated with the particular UE devices 110. For example, for each data stream associated with the particular UE device 110, data stream field 620 may store a bearer ID, a QoS class ID, an application ID for an application associated with a data stream, and/or another type of data stream ID.

Each RAT type record 630 may store information relating to a RAT type associated with the particular UE device 110 during a particular time period. Thus, each time the RAT type associated with the particular UE device 110 changes, a new RAT type record 630 may be generated. Each RAT type record 630 may include a time period field 640, a RAT type field 650, and a RAT metrics field 660. Time period field 640 may store information identifying a particular time period associated with a RAT type used to communicate with the particular UE device 110. For example, time period field 640 may include a time stamp for when the RAT type associated with UE device 110 changed to the RAT type associated with the RAT type record 630 and/or a time stamp for when the RAT type changed to a different RAT type. UE device record 600 may include a most recent RAT type record 630 that identifies a current RAT type associated with the particular UE device 110. RAT type field 650 may identify a particular RAT type associated with the particular time period. For example, RAT type field 650 may identify a 5G NR RAT type, a 4G LTE RAT type, Wi-Fi, Bluetooth, and/or another type of RAT.

RAT metrics field 660 may store information relating to one or more metrics associated with the particular RAT type. For example, RAT metrics field 660 may include one or more measures of quality, capacity, and/or availability for the air interface associated with the particular RAT type. The one or more metrics may include, for example, a packet loss rate value, a block error rate (BLER) value, a Reference Signal Receive Power (RSRP) value, a Received Signal Strength Indicator (RSSI) value, a pathloss value, a percent of time interval reaching maximum power value, an antenna reflected power value, an error rate value, a power headroom value, a data throughput value, a modulation and coding scheme (MCS) metric value, and/or another measure of connection quality. RAT manager 520 may use the information stored in RAT metrics field 660 to determine whether to switch to a different RAT type for UE device 110.

Although FIG. 6 shows exemplary components of groups DB 530, in other implementations, groups DB 530 may include fewer components, different components, additional components, or differently arranged components than depicted in FIG. 6.

Figure 7:
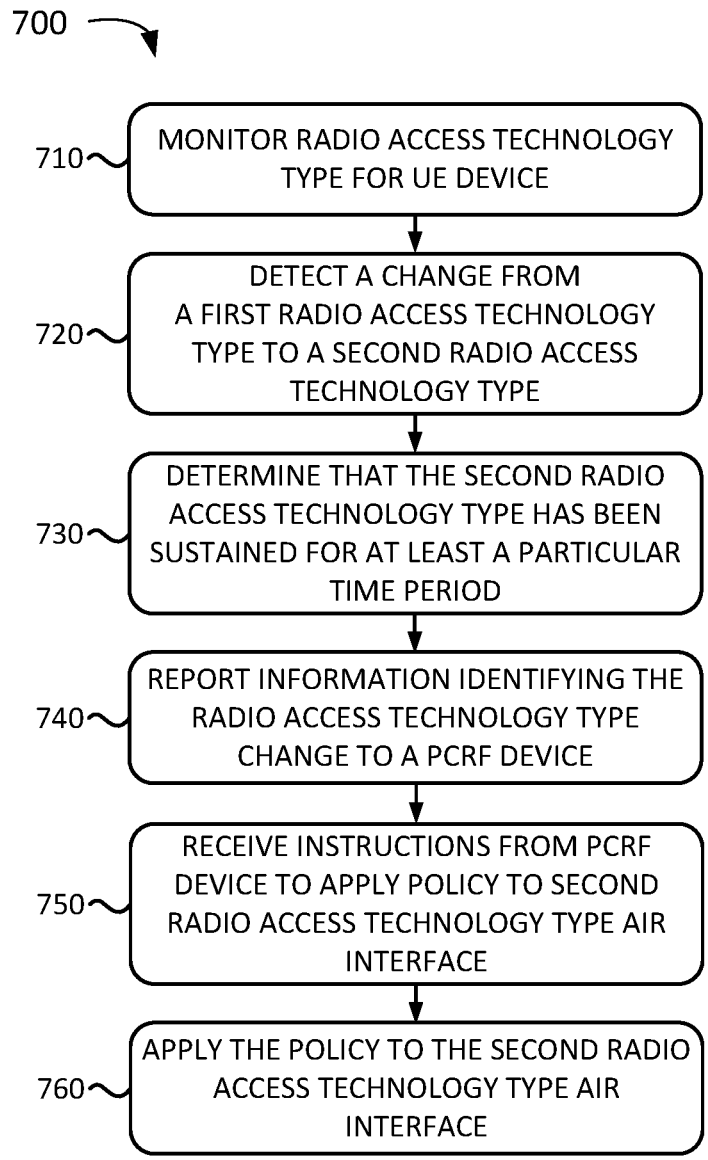
FIG. 7 is a flowchart of a process for reporting a radio access technology type change according to an implementation described herein.

FIG. 7 is a flowchart 700 of a process for reporting a RAT type change according to an implementation described herein. In some implementations, the process of FIG. 7 may be performed by gNodeB 220. In other implementations, some or all of the process of FIG. 7 may be performed by another device or a group of devices separate from gNodeB 220, such as one or more other components of wireless access network 120.

The process of flowchart 700 may include monitoring a RAT type for UE device 110 (block 710). For example, RAT manager 520 may monitor the RAT type associated with UE device 110. 5G NR air interface monitor 510 may monitor one or more metrics associated with a current RAT type and RAT manager 520 may use the metrics information obtained by 5G NR air interface monitor 510 to determine whether to switch to a different RAT type for UE device 110. Thus, if a signal quality metric, a capacity metric, an availability metric, a reliability metric, and/or another type of metric for the RAT type is determined to be below or above a particular threshold, RAT manager 520 may select to switch the RAT type. For example, RAT manager 520 may select to switch from a 5G NR RAT to a 4G LTE RAT if the signal quality associated with the 5G NR RAT is below a signal quality threshold or to switch from a 4G LTE RAT to a 5G NR RAT if the signal quality associated with the 5G NR RAT is above the signal quality threshold. RAT manager 520 may monitor how long a particular RAT type has been maintained for a particular UE device 110.

A change from a first RAT type to a second RAT type may be determined (block 720) and a determination may be made that the second RAT type has been sustained for at least a particular time period (block 730). For example, RAT manager 520 may determine that a RAT type has changed from a first RAT type to a second RAT type and that the second RAT type has been maintained longer than a particular time period. The particular time period may be based on a configurable timer. As an example, the timer may be set to a low value for a first gNodeB 220 that has low variability (e.g., number times below a signal quality threshold during a particular time period) in the signal quality of the 5G NR air interface and may be set to a high value for a second gNodeB 220 that has high variability in the signal quality of the 5G NR air interface. If RAT manager 520 determines that the second RAT type has been sustained for at least the particular time period, RAT manager 520 may select to report the RAT type change to PCRF device 260.

Information identifying the RAT type change may be reported to PCRF device 260 (block 740). For example, RAT manager 520 may send a report to PCRF device 260 relating to the RAT type change. The report may include, for example, information identifying the first RAT type and the second RAT type, information identifying a time associated with the RAT type change, information identifying UE device 110 associated with the RAT type change, information identifying a data stream type associated with UE device 110; information identifying a data throughput associated with UE device 110; information identifying a data use history associated with UE device 110; and/or other types of information. RAT manager 520 may send the report to PCRF device 260 via eNodeB 210 using X2 interface 214, via a network function device configured to interface gNodeB 220 with PCRF device 260, directly to PCRF device 260 using an interface configured to enable communication between gNodeB 220 and PCRF device 260, and/or using a different signal path.

Instructions may be received from PCRF device 260 to apply a policy to the second RAT type air interface (block 750) and the policy may be applied (block 760). For example, gNodeB 220 may receive an instruction from PCRF device 260 to restrict a data throughput for a particular data stream associated with UE device 110, to restrict the throughput for all data streams associated with UE device 110, to restrict the throughput for data streams associated with a particular QoS, and/or to apply another policy. In response, gNodeB 220 may implement the policy based on the instruction received from PCRF device 260.

Figure 8:
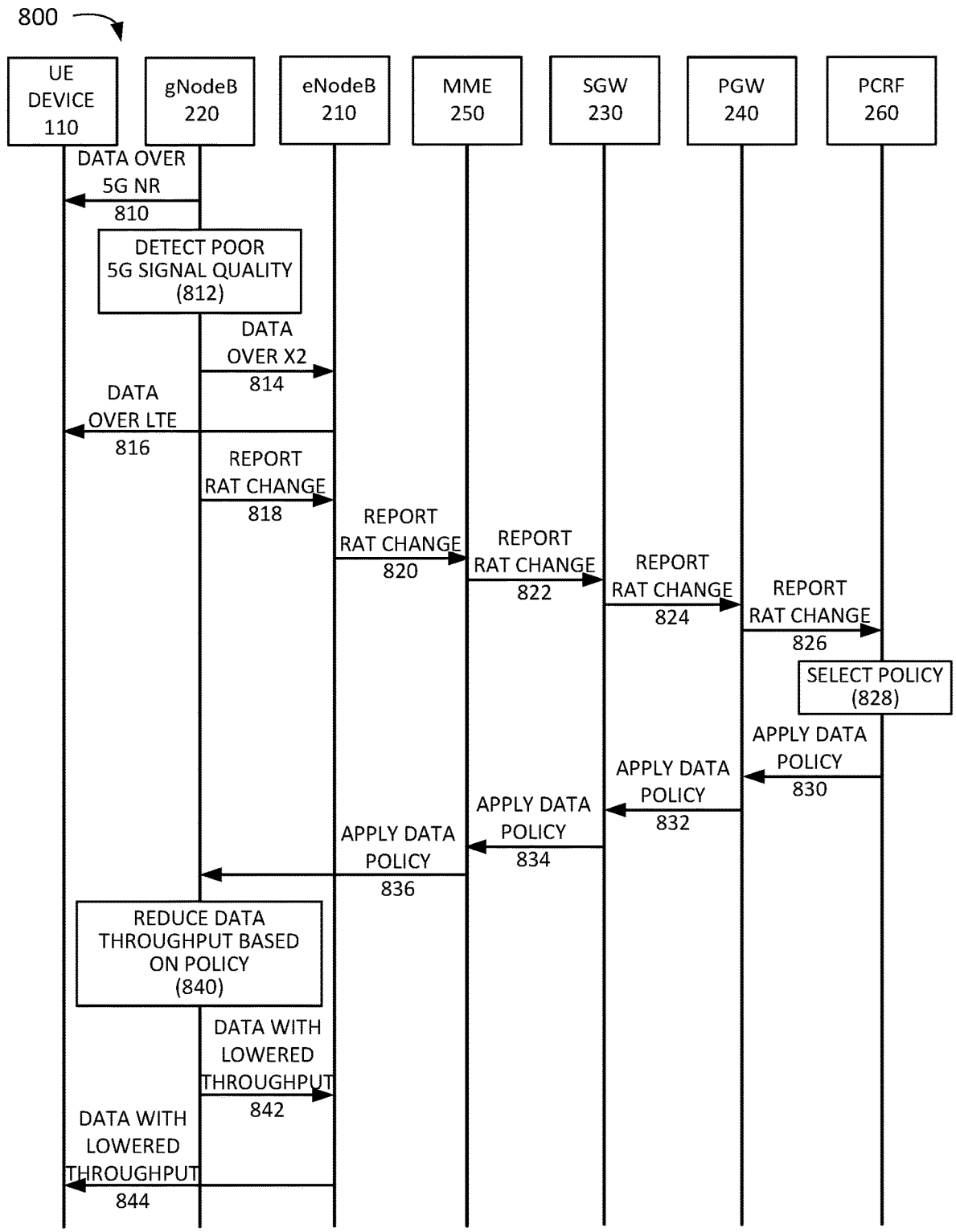
FIG. 8 is an exemplary signal flow of processing a radio access technology type change according to an implementation described herein.

FIG. 8 is an exemplary signal flow 800 of processing a RAT type change according to an implementation described herein. As shown in FIG. 8, signal flow 800 may include gNodeB 220 sending data to UE device 110 over a 5G NR air interface (block 810). gNodeB may then detect poor signal quality (e.g., below a signal quality threshold) for the 5G NR air interface (block 812). In response, RAT manager 520 may select to send data to UE device 110 via eNodeB 210 over X2 interface 214 (signal 814) and eNodeB 210 may forward the data to UE device 110 using a 4G LTE air interface (signal 816). Furthermore, RAT manager 520 may select to report the change after the RAT type change has been maintained for a particular length of time.

gNodeB 220 may report the RAT type change for UE device 110 from the 5G NR air interface to the 4G LTE air interface to PCRF device 260 via eNodeB 210 using X2 interface 214 (signal 818) and eNodeB 210 may forward the reported RAT type change to MME 250 (signal 820). MME 250 may forward the reported RAT type change to SGW 230 (signal 822) and SGW 230 may forward the reported RAT type change to PGW 240 (signal 824). PGW 240 may then forward the reported RAT type change to PCRF device 260 (signal 826).

PCRF device 260 may select a policy associated with the 4G LTE RAT type. For example, PCRF device 260 may select to reduce a data throughput for a data stream associated with UE device 110 based on a capacity associated with the 4G LTE air interface (block 828). PCRF device 260 may send an instruction to apply the selected policy to the data stream to PGW 240 (signal 830), PGW 240 may forward the instruction to apply the selected policy to SGW 230 (signal 832), may forward the instruction to apply the selected policy to MME 250 (signal 834), and MME 250 may forward the instruction to apply the selected policy to gNodeB 220 (signal 836). In response to receiving the instruction, gNodeB 220 may reduce the data throughput for the data stream associated with UE device 110 based on the policy (block 840). As a result, the data sent to UE device 110 by gNodeB 220 via eNodeB 210 using X2 interface 214 may be sent at a rate based on the lowered throughput (signals 842 and 844).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 7, and series of signal flows have been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   monitoring, by a base station, a radio access technology type being used by a user equipment (UE) device to wirelessly communicate with the base station;
   selecting, by the base station, to change from a first radio access technology type to a second radio access technology type for the UE device based on one or more metrics associated with the first radio access technology type;
   detecting, by the base station, the change from the first radio access technology type to the second radio access technology type for the UE device;
   determining, by the base station, that the second radio access technology type has been sustained for at least a particular time period;
   reporting, by the base station, information identifying the change from the first radio access technology type to the second radio access technology type to a Policy and Charging Rules Function (PCRF) device;
   receiving, by the base station, an instruction from the PCRF device to apply a policy associated with the second radio access technology type, wherein the policy associated with the second radio access technology type is different from a policy associated with the first radio access technology type; and
   applying, by the base station, the policy associated with the second radio access technology type to the UE device.

2. The method of claim 1, wherein the first radio access technology type includes a Fifth Generation (5G) New Radio (NR) air interface and wherein the second radio access technology type include a Long Term Evolution (LTE) air interface.

3. The method of claim 1, wherein the first radio access technology type includes a Long Term Evolution (LTE) air interface and wherein the second radio access technology type includes a Fifth Generation (5G) New Radio (NR) air interface.

4. The method of claim 1, wherein reporting information identifying the change from the first radio access technology type to the second radio access technology type to the PCRF device includes:
   sending the information identifying the change from the first radio access technology type to the second radio access technology type to the PCRF device via an eNodeB base station over an X2 interface.

5. The method of claim 1, wherein reporting information identifying the change from the first radio access technology type to the second radio access technology type to the PCRF device includes:
   sending the information identifying the change from the first radio access technology type to the second radio access technology type to the PCRF device via a device configured to interface the base station with the PCRF device.

6. The method of claim 1, wherein reporting the information identifying the change from the first radio access technology type to the second radio access technology type to the PCRF device includes:
   sending the information identifying the change from the first radio access technology type to the second radio access technology type to the PCRF device over an interface configured to interface the base station with the PCRF device.

7. The method of claim 1, wherein selecting to change from the first radio access technology type to the second radio access technology type for the UE device includes:
   determining that a signal quality associated with the first radio access technology type for the UE device is lower than a signal quality threshold, wherein the first radio access technology type corresponds to a Fifth Generation (5G) New Radio (NR) air interface; and
   selecting to communicate with the UE device via the second radio access technology type, wherein the second radio access technology type corresponds to a Long Term Evolution (LTE) air interface, in response to determining that a signal quality associated with the first radio access technology type for the UE device is lower than a signal quality threshold.

8. The method of claim 1, wherein the information identifying the change from the first radio access technology type to the second radio access technology type includes:
   information identifying the first radio access technology type and the second radio access technology type;
   information identifying a time associated with the change;
   information identifying a data stream type associated with the UE device;
   information identifying a data throughput associated with the UE device; or
   information identifying a data use history associated with the UE device.

9. The method of claim 1, wherein receiving the instruction from the PCRF device to apply the policy associated with the second radio access technology type includes:
   receiving, from the PCRF device, an instruction to reduce a data throughput associated with the UE device; and
   wherein applying the policy associated with the second radio access technology type to the UE device includes:
   reducing the data throughput associated with the UE device, in response to receiving the instructions to reduce the data throughput.

10. The method of claim 9, wherein the data throughput is reduced based on a data throughput capacity associated with the second radio access technology type.

11. A computer device managing a base station, the computer device comprising:
    a memory configured to store instructions; and
    a processor configured to execute the instructions to:

monitor a radio access technology type being used by a user equipment (UE) device to wirelessly communicate with the base station;

select to change from a first radio access technology type to a second radio access technology type for the UE device based on one or more metrics associated with the first radio access technology type;

detect the change from the first radio access technology type to the second radio access technology type for the UE device;

determine that the second radio access technology type has been sustained for at least a particular time period;

report information identifying the change from the first radio access technology type to the second radio access technology type to a Policy and Charging Rules Function (PCRF) device receive an instruction from the PCRF device to apply a policy associated with the second radio access technology type, wherein the policy associated with the second radio access technology type is different from a policy associated with the first radio access technology type; and apply the policy associated with the second radio access technology type to the UE device.

12. The computer device of claim 11, wherein the first radio access technology type includes a Fifth Generation (5G) New Radio (NR) air interface and wherein the second radio access technology type include a Long Term Evolution (LTE) air interface.

13. The computer device of claim 11, wherein the first radio access technology type includes a Long Term Evolution (LTE) air interface and wherein the second radio access technology type includes a Fifth Generation (5G) New Radio (NR) air interface.

14. The computer device of claim 11, wherein when reporting information identifying the change from the first radio access technology type to the second radio access technology type to the PCRF device, the processor is further configured to:

send the information identifying the change from the first radio access technology type to the second radio access technology type to the PCRF device via an eNodeB base station over an X2 interface.

15. The computer device of claim 11, wherein when reporting information identifying the change from the first radio access technology type to the second radio access technology type to the PCRF device, the processor is further configured to:

send the information identifying the change from the first radio access technology type to the second radio access technology type to the PCRF device via a device configured to interface the base station with the PCRF device.

16. The computer device of claim 11, wherein when reporting information identifying the change from the first radio access technology type to the second radio access technology type to the PCRF device, the processor is further configured to:

send the information identifying the change from the first radio access technology type to the second radio access technology type to the PCRF device over an interface configured to interface the base station with the PCRF device.

17. The computer device of claim 11, wherein, when the processor is to select to change from the first radio access technology type to the second radio access technology type for the UE device, the processor is further configured to:

determine that a signal quality associated with the first radio access technology type for the UE device is lower than a signal quality threshold, wherein the first radio access technology type corresponds to a Fifth Generation (5G) New Radio (NR) air interface; and select to communicate with the UE device via the second radio access technology type, wherein the second radio access technology type corresponds to a Long Term Evolution (LTE) air interface, in response to determining that a signal quality associated with the first radio access technology type for the UE device is lower than a signal quality threshold.

18. The computer device of claim 11, wherein the information identifying the change from the first radio access technology type to the second radio access technology type includes:

information identifying the first radio access technology type and the second radio access technology type;

information identifying a time associated with the change;

information identifying a data stream type associated with the UE device;

information identifying a data throughput associated with the UE device; or information identifying a data use history associated with the UE device.

19. The computer device of claim 11, wherein, when receiving the instruction from the PCRF device to apply the policy associated with the second radio access technology type, the processor is further configured to:

receive, from the PCRF device, an instruction to reduce a data throughput associated with the UE device; and wherein, when applying the policy associated with the second radio access technology type to the UE device, the processor is further configured to:

reduce the data throughput associated with the UE device, in response to receiving the instructions to reduce the data throughput.

20. A system comprising:

a base station configured to:

monitor a radio access technology type being used by a user equipment (UE) device to wirelessly communicate with the base station;

select to change from a first radio access technology type to a second radio access technology type for the UE device based on one or more metrics associated with the first radio access technology type;

detect the change from the first radio access technology type to the second radio access technology type for the UE device;

determine that the second radio access technology type has been sustained for at least a particular time period; and report information identifying the change from the first radio access technology type to the second radio access technology type via an interface of the base station; and a Policy and Charging Rules Function (PCRF) device configured to:

receive the reported information identifying the change via the interface;

select a policy associated with the second radio access technology type, wherein the policy associated with the second radio access technology type is different from a policy associated with the first radio access technology type; and instruct the base station to apply the selected policy associated with the second radio access technology type to the UE device.

* * * * *